Feb. 2, 1937.  A. J. TOBIASON  2,069,428
CAST IRON DOUBLE HUB RUNNING TRAP
Filed April 14, 1936
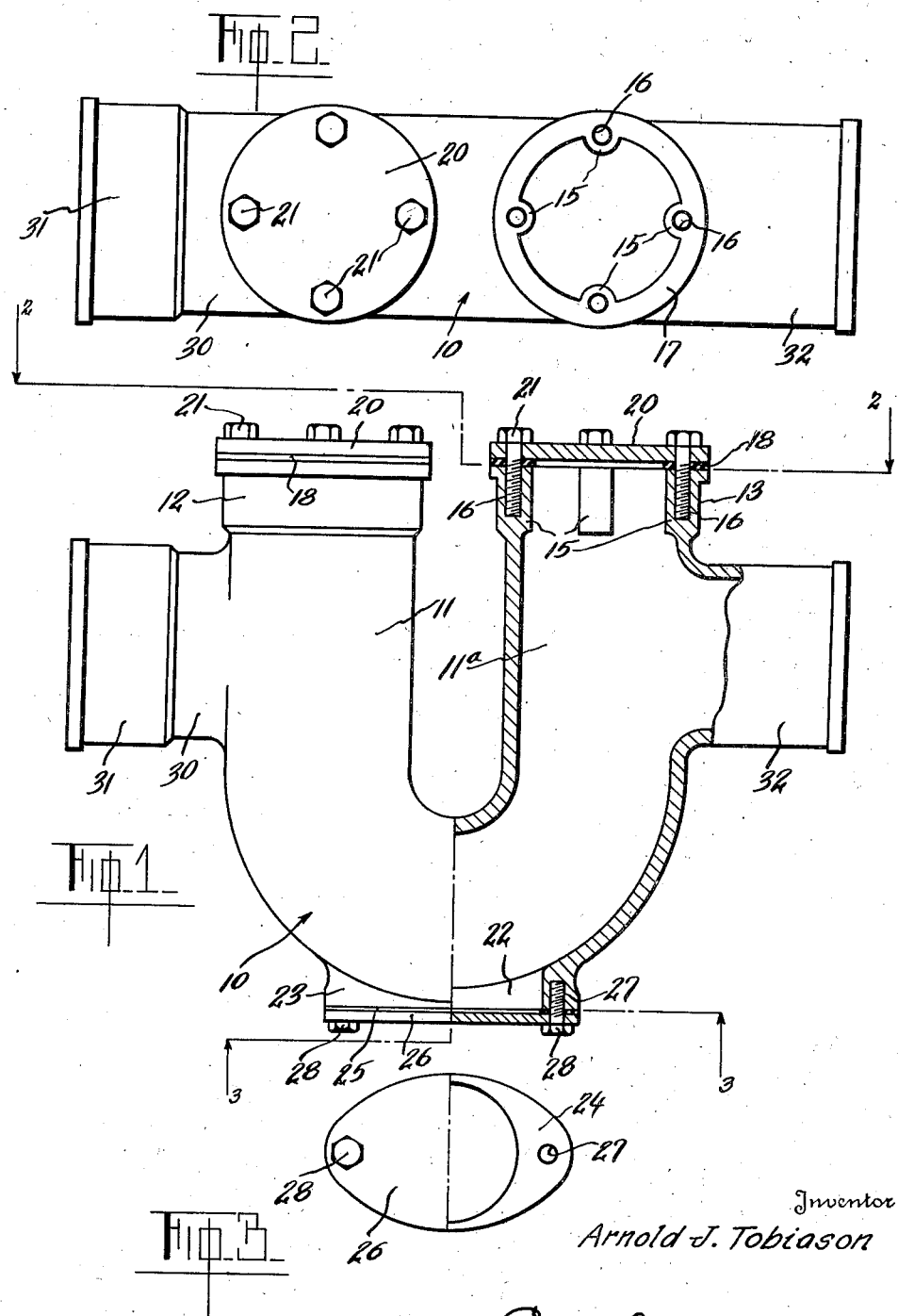
Inventor
Arnold J. Tobiason
By Carl Miller
Attorney Patented Feb. 2, 1937

2,069,428

UNITED STATES PATENT OFFICE 2,069,428

CAST IRON DOUBLE HUB RUNNING TRAP

Arnold J. Tobiason, Amityville, N. Y.

Application April 14, 1936, Serial No. 74,293

2 Claims. (Cl. 182—24)

This invention relates to pipe fittings and particularly to a novel form of cast iron trap.

It is the primary object and purpose of the present invention to provide an improved form of trap having a wide variety of uses, that will be formed to present two hubs constituting separate clean-outs each of which is to be provided with a separate and detachable cover, that will further present at its bottom an additional clean-out to be provided with a detachable cover.

A further object of the invention is to provide the trap with inlet and outlet pipe connections one on each leg of the trap and in horizontal alignment.

It is another object of the invention to provide a double hub trap as above characterized, which is of such form and construction that it may be readily cored in casting the trap.

With the above and other objects in view, the invention consists in the improved trap and in the form, construction and relative arrangement of its several parts as will be hereinafter more fully described, illustrated in the accompanying drawing and subsequently incorporated in the subjoined claims.

In the drawing:

Figure 1 is an elevational view partly in section of the trap and its associated parts.

Figure 2 is a plan view of the trap, with one cover removed taken on line 2—2, Figure 1.

Figure 3 is a detail view taken on line 3—3, Figure 1, showing the bottom clean-out and cover.

Referring in detail to the drawing and more particularly to Figure 1, 10 designates the body of the trap which is of the conventional U-shaped form providing parallel legs 11 and 12, and of uniform diameter throughout. The trap 10 is preferably formed as a casting of any suitable or desired metal, such as cast-iron, brass, etc.

Each of the legs 11 and 11a are preferably of equal length and are thickened at their end portions to define the hubs 12 and 13, the interior of said hubs being provided with diametrically opposed bosses 15 formed integral with said hubs. The bosses 15 extend lengthwise of the hubs and are each provided with a threaded bore 16 for the reception of bolts to be hereinafter described. The upper end of each of the hubs 12 and 13 is machined to provide a flat surface 17 adapted to have seated thereon a fitted gasket 18 of any desired material such as asbestos sheet packing, fibre, metal, rubber composition, etc., with openings therein to register with the threaded openings 16 in the bosses 15. Placed over each gasket is a metallic cover plate 20 the under surface of which may be machined for proper seating engagement with the gasket, said cover plate being formed with similar openings to register with the openings 16. Bolts 21 provided with square or hexagonal heads extend through the openings for threaded engagement with the threaded openings 16, and function to securely attach the cover plates 20 to the hubs 12 and 13.

The bottom of the trap 10 is provided with a central opening 22 having a thickened wall 23 elliptical in shape, the end 24 of which is machined to provide a true flat surface for the seating of a fitted gasket 25 thereon. The gasket 25 is of a similar material to the gasket 18 as above described. A cover plate 26 is fitted to the opening 22 and is provided with bolt receiving openings that register with similar openings in the gasket and in the thickened wall 23, the openings 27 therein being threaded for engagement with the bolts 28.

Each leg 11 and 11a of the trap 10 is provided with a lateral projecting pipe fitting. The pipe fitting 30 on the leg 11 is provided with a hub 31 to receive one end of a pipe (not shown) therein, while the pipe fitting 32 on the leg 11a is plain to permit the insertion thereof into the hub of a connecting pipe (not shown), said pipe fittings 30 and 32 being connected to their associated pipes in the manner well known in the plumbing art. The pipe fittings 30 and 32 are so constructed that the internal diameters thereof are equal.

With the attachment of a trap of the character as above described in a pipe line or main, should the same become clogged, it becomes a simple matter to remove either one of the upper cover plates 20 or the lower cover plate 26. The openings in the trap thus uncovered constitute clean-outs which as will be observed are conveniently located.

From the above description it is apparent that I have produced a simple and efficient trap, and while I have shown and described the preferred form of my invention, I, of course, reserve the right to make such changes as properly fall within the spirit and scope of the invention.

Having thus set forth and disclosed the nature of this invention, what is claimed is:

1. A trap of the character described comprising a body portion and parallel leg portions of substantial uniform thickness and internal diameter, said leg portions terminating in hubs of increased thickness, threaded bolt receiving portions provided at spaced intervals on the inside wall of said hubs, an inlet pipe fitting on one leg portion, an outlet pipe fitting on the other leg portion, said pipe fittings projecting laterally from said leg portions and in horizontal axial alignment, a cover plate fitted to the open end of each of said hubs and provided with bolt receiving openings registering with said hub bolt receiving portions, bolts inserted through said openings engaging said hub bolt receiving portions for securing said cover plates to said hubs, a formation at the bottom of said body portion defining an opening, and a cover plate removably secured to said opening.

2. A trap of the character described comprising a body portion and parallel leg portions of substantial uniform thickness and internal diameter, said leg portions terminating in hubs of uniform thickness, diametrically opposed bosses formed on the interior of said hubs and provided with longitudinal threaded openings, gaskets seated on said hubs, cover plates arranged over said gaskets and bolt means attaching said cover plates and gaskets to said hubs and being received in the threaded openings of said bores; an inlet pipe fitting on one leg portion, an outlet pipe fitting on the other leg portion, said pipe fittings projecting laterally from said leg portions and in horizontal axial alignment and of equal internal diameter; a formation at the bottom of said body portion defining an opening, a gasket seated on said opening, a cover plate seated on said gasket and bolt means securing said gasket and cover plate to said formation.

ARNOLD J. TOBIASON.